United States Patent Office 3,122,913
Patented Mar. 3, 1964

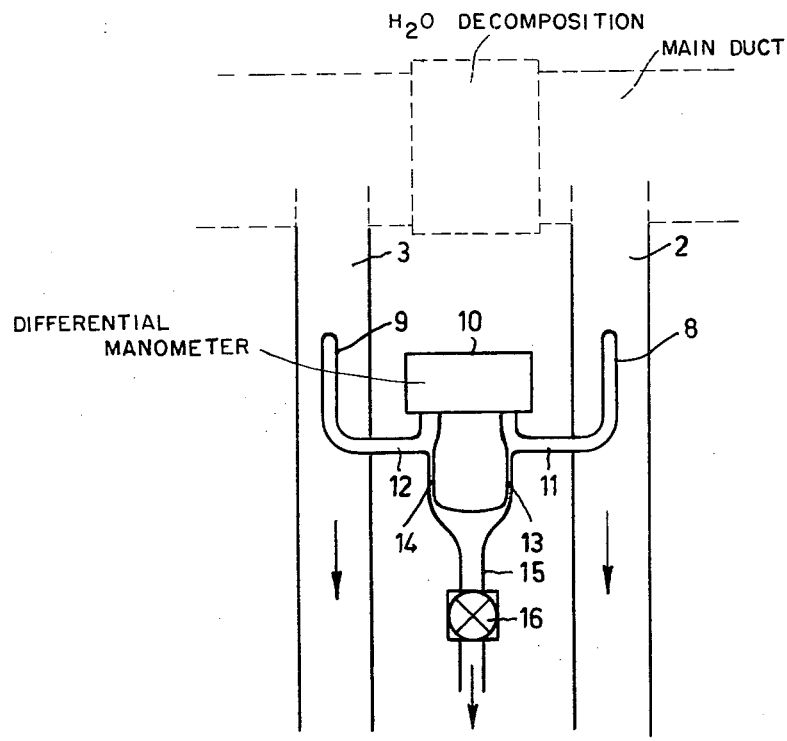

3,122,913
DEVICE FOR MEASURING THE WATER-VAPOUR CONTENT IN A FLOW OF GAS
Georges Le Gargasson, Paris, and Jean Robert Perilhou, Bourg la Reine, France, assignors to North American Philips Company Inc., New York, N.Y., a corporation of Delaware
Filed Feb. 17, 1960, Ser. No. 9,314
Claims priority, application France Feb. 24, 1959
2 Claims. (Cl. 73—23)

The invention relates to a device for measuring the water-vapour content of a flow of gas, in which the free oxygen contained in the flow of gas is removed to prevent the measurement from being disturbed thereby, while the free hydrogen is measured separately or removed and the water contained in the flow of gas is decomposed, while the oxygen is removed, and the pressure of the hydrogen is subsequently determined after its diffusion through a semipervious wall.

The known devices set forth comprise a palladium tube as a semipervious wall for the hydrogen, this tube being connected with a manometer. In the manometer an equilibrium pressure of hydrogen is attained in accordance with the partial pressure of the hydrogen in the flow of gas in which the measurement is carried out.

The known devices have a disadvantage in that not only hydrogen but after some time also other gases diffuse through the semipervious wall into the manometer and since the manometer is not capable of indicating specifically the pressure of hyrogen, an incorrect indication may result therefrom.

With nuclear reactors, for example, in which a flow of carbon dioxide is maintained at a pressure of 25 atmospheres for the heat exchange, which flow contains usually carbon monoxide under a pressure of 1 atmosphere, it is required to measure the pressure of the water vapor and the hydrogen, which pressure amounts to a maximum of a few millimetres. Although the diffusion coefficient of carbon dioxide and carbon monoxide through palladium is considerably lower than that of hydrogen, a disturbing volume of carbon dioxide and carbon monoxide will nevertheless penetrate into the interior of the manometer owing to the high pressures of these two gases.

The invention has for its object to obviate the said disadvantage.

In the device for measuring the water-vapour content in a flow of gas, in which free oxygen contained in the flow of gas is removed in order to prevent the measurement from being disturbed thereby, while the free hydrogen is measured separately or drained off and the water contained in the flow of gas is decomposed while removing the oxygen and subsequently the pressure of the hydrogen is determined after its diffusion through a semipervious wall, the manometer for determining the pressure of the free hydrogen and for determining the sum of the pressures of the free hydrogen and of the hydrogen obtained by the decomposition of water are, in accordance with the invention, connected with a pump system via ducts having a resistance such that the pressures of the hydrogen in the manometer are affected only to a slight extent, whereas the pressures of the gases other than hydrogen, also diffused into the manometer, can no longer have a disturbing effect.

In accordance with the invention, the two chambers of the manometer for measuring the hydrogen pressure are preferably connected with a pump system via capillary tubes of adequate length.

The invention will be described more fully with reference to the accompanying drawing, in which a device according to the invention is shown diagrammatically.

The ducts 2 and 3 constitute tappings of the main duct, in which the pressure of the free hydrogen and the sum of the pressures of the free hydrogen and of the hydrogen set free by the decomposition of water are to be determined. The ducts 2 and 3 comprise the palladium tubes 8 and 9, which are heated in a manner not shown. The palladium tubes communicate through ducts 11 and 12 with the two measuring chambers of the differential manometer 10. This may be a membrane manometer of high sensitivity, capable of indicating pressure differences of fractions of a millimetre. From the ducts 11 and 12 communicate two capillary tubes 13 and 14 with a common duct 15, which is connected with a single-stage plate pump 16. Such a pump is capable of producing a vacuum of the order of $5.10^{-4}$ to $5.10^{-3}$ mm./Hg. The two capillary tubes have a length of 10 cms. and an inner diameter of about 0.1 mm. Owing to the capillary tubes in the pump duct, the pressure in the two measuring chambers of the manometer 10, as far as the hydrogen is concerned, is about 98% of that prevailing in the case in which the pump is out of operation. The pressure of the gases such as carbon dioxide and carbon monoxide diffusing out of the ducts 2 and 3, which gases diffuse through the walls 8 and 9 with considerably smaller speed, is so low owing to the continuous pumping action, that no disturbance of the measurement is to be feared from this side. The small reduction in pressure due to the pumping action, as far as the hydrogen is concerned, can be taken into consideration when calibrating the manometer 10.

What is claimed is:
1. A device for measuring the water-vapor content in a flow of gas in a main duct by decomposing the water vapor into hydrogen and oxygen and measuring the difference in pressure between the hydrogen content of said gas flow after decomposition of said water vapor and the hydrogen content of said gas flow before decomposition of said water vapor comprising a first tap duct connected to the main gas flow duct at a point prior to the area of water-vapor decomposition, a second tap duct connected to the main gas flow duct at a point subsequent to the area of water-vapor decomposition, a single hollow tube positioned within each of said tap ducts, each of said hollow tubes having wall portions semi-permeable to hydrogen and relatively impermeable to other gases and each of said hollow tubes having a closed end adjacent to the main duct and an open end connected by means of a connecting duct to separate chambers of a two chambered manometer and a pumping means attached to said manometer, said pumping means operating at a rate sufficiently high to remove substantially all of the main gases other than hydrogen from the chambers of the manometer but sufficiently low so as not to remove the hydrogen gas from the chambers of the manometer.

2. The device of claim 1 wherein the hollow tubes are formed of palladium.

References Cited in the file of this patent
UNITED STATES PATENTS
2,045,379    Bennett _____ June 23, 1936
2,456,163    Watson _____ Dec. 14, 1948